Patented Jan. 2, 1945

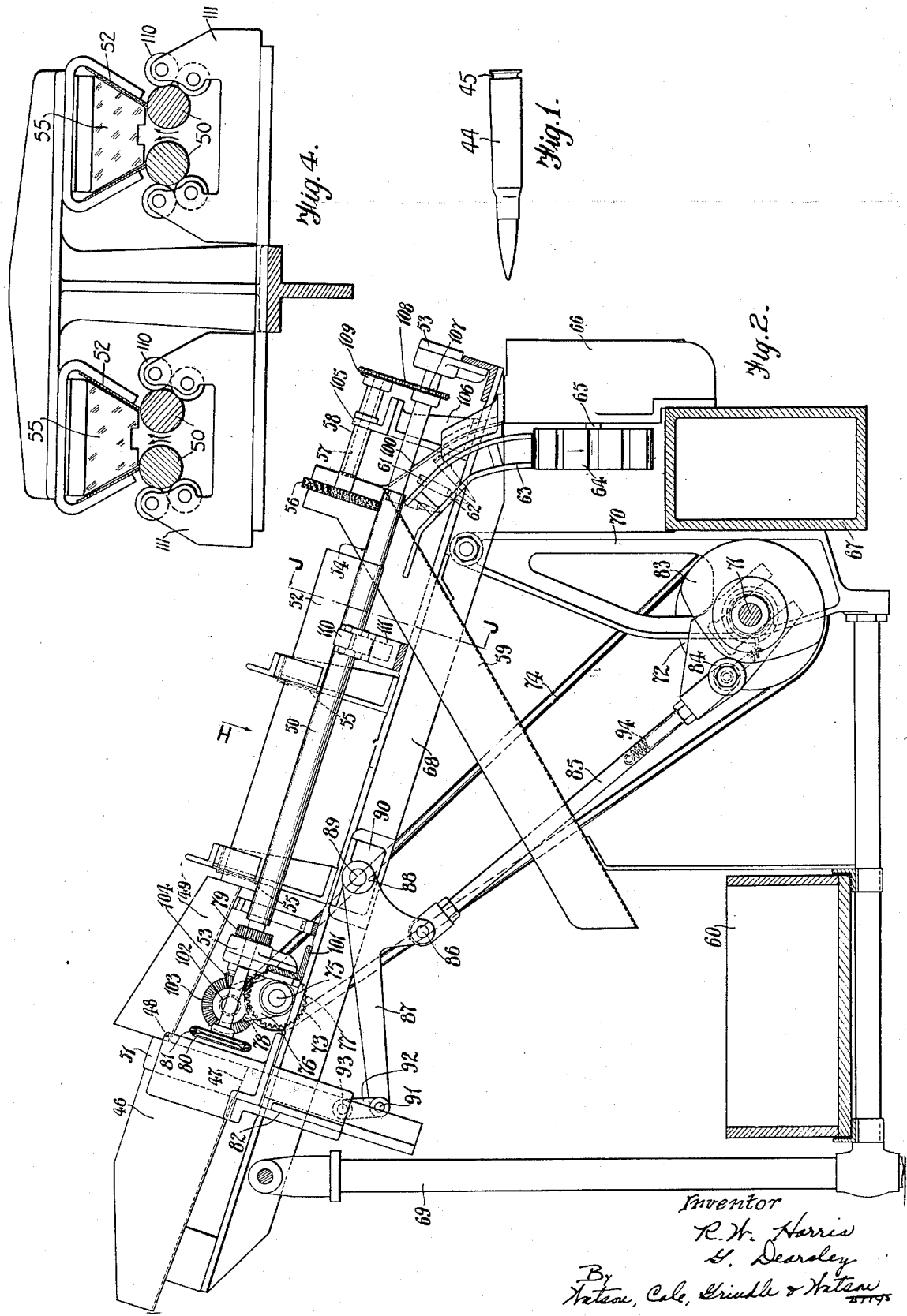

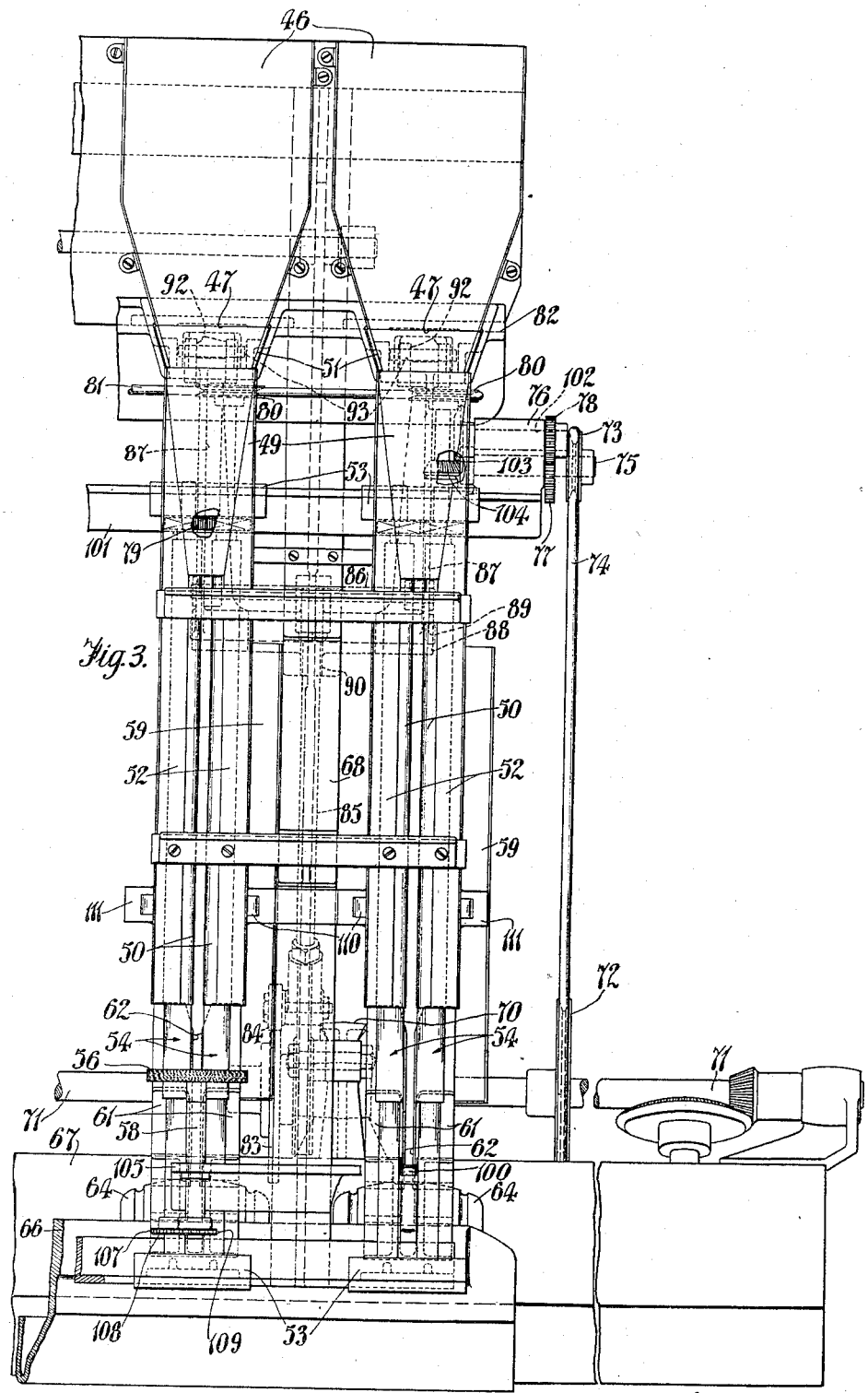

2,366,256

UNITED STATES PATENT OFFICE 2,366,256

APPARATUS FOR FEEDING ARTICLES

Richard William Harris and George Dearsley, Deptford, London, England, assignors to Molins Machine Company Limited, London, England Application February 27, 1941, Serial No. 380,934
In Great Britain March 6, 1940

5 Claims. (Cl. 193—43)

This invention is for improvements in apparatus for feeding and orienting articles.

The term "article" when used herein and in the appended claims, means an article having an enlarged portion by means of which the article in whatever way it is presented will be suspended between spaced supports when arranged to form a slot longer than the longest dimension of the article. Examples of such articles are screws, nails, rivets, cartridges for small arms ammunition and links of a kind hereinafter described. A cartridge may or may not be provided with a flange at the larger end.

According to the invention there is provided apparatus for orienting articles, wherein articles to be oriented are received by a pair of elements having cylindrical or other curved, opposed surfaces (e. g. rotatable rollers) which are spaced apart by a distance such that an article can be supported therebetween by engagement of the enlarged portion of the article while a part of the article is directed downwardly between said surfaces, at least one of said opposed surfaces being arranged to move in an upward direction, the axes about which the opposed surfaces are generated may be inclined downwardly to cause movement of oriented articles in a downward direction between the surfaces lengthwise of those axes, to a position at which the oriented articles are delivered from said element. A yieldable (e. g. flexible) baffle may be disposed above said element to impede the downward movement of unoriented articles. A container may be provided for articles to be oriented and transfer means (e. g. a conveyor) may be arranged to transfer articles from the container and deliver them to said elements. Removal means may be operative to remove unoriented articles from the vicinity of oriented articles whilst the latter are supported between said opposed surfaces, said removal means being disposed above and adjacent the position at which the oriented articles are delivered from said element. Said removal means may comprise a deflector (e. g. a rotating brush or a rotating paddle) adapted to deflect unoriented articles to one side of said elements. Said elements may comprise rollers, the diameters of which are slightly reduced in the region of operation of said removal means to facilitate the operation of said removal means.

It has previously been proposed to orient terminal parts by a pair of oppositely rotating screws which also feed the articles forwardly in a positive manner. The present invention orients the articles by means of rollers; that is to say, by rollers as distinct from screws or so called rollers having helical grooves therein. The rollers, according to the present invention, are inclined downwardly whereby a gravity or yielding feed is provided.

Further according to the invention, there is provided apparatus for feeding tapered articles (e. g. cartridges) wherein spaced downwardly inclined guide elements are adapted to engage an article which is between them, below its centre of gravity and wherein an article is adapted to enter the space between the guide elements with its smaller end pointed downwardly and with a component of movement in the direction in which the guides slope downwardly, the guide elements being adapted to afford sufficient resistance to the continued free forward movement of the article so as to cause it to tip over forwardly.

Two embodiments of the invention will be described with reference to the accompanying drawings, in which:

Figure 1 shows a cartridge to illustrate the nature of articles which may be fed by the apparatus herein described.

Figure 2 shows a side elevation partly in section of an apparatus for feeding and orienting the cartridges.

Figure 3 is a view of Figure 2 taken in the direction of the arrow H.

Figure 4 is a cross section of Figure 2 on the line J—J.

Referring now to Figures 1 to 4, the cartridges to be oriented and fed in this case are 7.92 m. m. Mauser cartridges having no flanges at their larger ends. The cartridges each comprise a tapering casing 44 which at its smaller end is stepped down to receive a bullet. At a point near to the large end of the casing the latter is provided with a narrow, shallow circumferential groove 45. At no point is the cartridge of greater diameter than at the bigger end of the tapering casing. Such a cartridge is shown in Figure 1. The cartridges are placed in a hopper 46 having a bottom which slopes downwards towards the end from which the cartridges are removed. Removal is effected by a reciprocating plunger or platform 47 having a sloping top surface. When the platform is in its lowest position the upper surface of the platform is substantially flush with the bottom of the hopper and therefore some cartridges slide on to the platform. The platform is then raised, carrying such cartridges upwards until the upper surface of the platform passes a position marked 48 in Figure 2, when the cartridges slide off it and into a chute or trough 49 down which they slide towards a pair of rollers 50. The platform 47 has side extensions 51 which prevent cartridges from falling out sideways. Sloping guide plates 52 are provided to prevent cartridges from falling off the rollers during this movement. The width of the platform considered in the direction of slope thereof is less than the length of a cartridge so that should some of the cartridges resting on the platform extend lengthwise in the direction of slope of the platform, they will not tend to carry other cartridges upwardly out of the hopper. Should the cartridges be so arranged on the platform, the weight of other cartridges resting on the unsupported ends of the cartridges on the platform will, when the platform is raised, cause such overhanging cartridges to fall off the platform. This may result in more cartridges being removed from the hopper by the platform at some times than at other times, but the arrangement just described is found to provide a satisfactory average delivery of cartridges from the hopper. The longitudinal axes of the rollers are parallel and the rollers are spaced apart from each other by a distance such as to permit the smaller ends of the cartridges to pass between the rollers but to prevent the larger ends from passing therebetween. The spacing of the rollers is such that a cartridge is engaged by the rollers at a point between the centre of gravity of the cartridge and the large end thereof. By this arrangement the cartridges falling on to the rollers are oriented so that their smaller or pointed ends hang downwardly between the rollers.

The rollers are mounted for rotation in bearings 53 and are rotated about their longitudinal axes by driving mechanism described later, in a manner such that at the points of contact with the larger portions of the cartridges the surfaces of the rollers move upwardly thus preventing jamming of the cartridges between the rollers. The axes of rotation of the rollers are inclined, as shown in Figure 2, at a sufficient angle to allow movement of the cartridges, due to the force of gravity, along the space between the rollers to a discharge position.

The discharge position is located at a sufficient distance from the hopper to give time for the cartridges to be properly arranged and depending on the output desired from the apparatus. For a desired distance, e. g. four inches, from the discharge position, the diameter of the rollers is slightly reduced at 54 so that before the cartridges reach the discharge position they move still further downwardly between the rollers. In order to control the flow of cartridges from the hopper to the rollers and to give them time to locate themselves properly between the rollers, flexible baffles 55 are provided which retard the movement of the cartridges down the rollers, thus providing more opportunity for the cartridges to be properly oriented before they reach the delivery ends of the rollers. Two baffles are shown in fixed positions, but they may be adjustable lengthwise of the rollers. By this means a line of cartridges moves along the space between the rollers but the large ends of the cartridges nearest the discharge position are at a lower level than those nearer the hopper. At a position above the lower line of cartridges there is provided a stripping device which is directed towards the line of cartridges at about the level of the higher line of cartridges and which operates to remove unoriented cartridges which may be riding on the upper surfaces of the oriented cartridges, or on the upper surfaces of the rollers 50. The stripping device comprises a rotatable brush 56, for example a wire brush, fixed to a spindle 57 which is mounted in a bearing 58 and driven as described later. The reduction in the diameter of the rollers is of the order of .005" which, it is found, when operating upon the 7.92 mm. cartridges above referred to, gives, due to the taper of the cartridge casing, a difference of about $\tfrac{5}{16}''$ in height between the higher and the lower cartridges. Cartridges deflected by the rotatable brush fall into a chute 59 and slide down it into a box or drawer 60. Periodically the box is removed and the cartridges collected in it are returned to the hopper manually.

After passing the stripping device the cartridges arrive at the discharge position, where they are engaged by guides 61 and 62 which guide the cartridges so that they are delivered on their sides on to a support described below. The cartridges are, when they are discharged from the rollers, directed point downwardly and they are, therefore, moved through substantially 90° while being delivered on to the support. To assist the movement, the stepped portions of the cartridge cases are engaged by the guides 62 which constitute a pair of opposed substantially straight inclined guides which cause the upper or larger portions of the cartridges to tip forwardly due to the fact that the points at which the cases are engaged by the guides are below the centres of gravity of the cartridges and to a component of movement in the direction in which the guides 61 and 62 slope downwardly. This component of movement is derived from the downward movement along the rollers 50. The guides 61 and 62 are adapted to afford sufficient resistance to the continued free forward movement of the cartridge to cause the latter to tip over forwardly. This movement may be better understood by reference to Figure 2 where cartridges are shown in chain lines in the upper and lower positions. The straight guides 62 merge into curved guides 63 which deliver them to the support. A top guide 100 controls the heads of the cartridges during their movement between the guides.

The cartridges may be removed from the support in any desired manner. In the present case the support consists of a fluted drum 64 fixed to a spindle 65 rotatable in bearings in a housing 66 which is fixed on a machine bed 67. All these parts are elements of a machine for assembling cartridges with links or a belt to form a machine gun belt such, for example, as the machine described in British Patent application No. 30,-822/39 and no further description is necessary as such machine forms no part of the present invention.

When starting the apparatus a number of cartridges are manually placed between the guides with the lowest one resting on the drum 64 or means is provided to prevent the drum from feeding cartridges away from the guides until a reserve has been built up between the guides. It will be appreciated that the delivery of oriented cartridges from the rollers 50 is not at all times regular, thus the provision of a reserve when the machine is operating. The guides 61 and 62 operate to tip the cartridges forwardly only when the top cartridge of the reserve is below the level at which it would be engaged by the tip of a cartridge when the latter is engaged by the guides. If the height of the reserve is above this level, the forward tipping of a cartridge is effected due to the engagement of the tip thereof with the top cartridge in the reserve and due to its forward component of movement.

Instead of employing a pair of rollers the curved oppositely moving surfaces may be constituted by the surfaces of endless bands passing over rotatable guide rollers, axially spaced pulleys or over curved stationary guide supports. In each of the embodiments of the invention above described, the inclination of the axes of rotation of the rollers may be adjustable.

Further, the rollers may have smooth or roughened, grooved or knurled surfaces depending on the amount of joggling necessary to position the articles properly between the rollers. The nature of, or the necessity for this joggling movement depends on the shape, nature and smoothness or roughness of the article.

In Figure 3, two hoppers with sets of rollers and associated parts are shown, but it will be appreciated that any number of such units may be employed according to the number of various kinds of cartridges it is desired to feed to a belt assembling machine and to the output desired. In a particular example one hopper is as shown in Figure 3 to feed one kind of cartridge while four others sets of rollers all handle another sort of cartridge. In this case the hopper box is formed as a common receptacle but provided with a plunger 47 to each set of rollers.

As will be seen from Figure 2 the hopper structure is supported on a T-rail 68 which is in turn supported by a pillar 69 and a bracket 70 which is fixed to the machine bed 67. These supports are duplicated as necessary according to the number of hoppers employed. The mainshaft 71 of the belt assembling machine provides the power for driving the hopper mechanism. A pulley 72 on the mainshaft drives another pulley 73 by means of a belt 74. The pulley 73 is fixed on a spindle 75 journalled in a bearing 76 fixed to an angle bar 101. To the spindle 75 is also fixed a spur gear 77 which engages with another spur gear 78 fixed to a spindle 102 also journalled in the bearing 76. The spindle 102 has a bevel gear 103 fixed to its other end which engages with a smaller bevel gear 104 fixed to one of the rollers 50. The rollers of each pair are geared together by spur gears 79. One roller of each pair also has fitted thereto a pulley 80 and a belt 81 on said pulleys transmits the motion to each set of rollers.

The platform 47 moves up and down in guides 82 and is driven from the mainshaft 71 by a cam 83 fixed to said shaft which engages a roller 84 mounted on a cam rod 85. The other end of the cam rod is pivoted at 86 to a bell crank lever 87 a boss 88 of which is fixed to a spindle 89 mounted in a bearing 90 secured to the T rail 68. The free end of the bell crank lever is pivoted at 91 to a link 92 which is in turn pivoted at 93 to the platform 47. A spring 94 co-operates with the cam and moves the parts in the reverse direction. The brush 56 is supported by means of an angle member 105 to which the bearing 58 is fixed, the member 105 being fixed to a bracket 106 fixed on the T rail. A sprocket wheel 107 fixed to one roller 50 is connected by a chain 108 to another sprocket wheel 109 fixed to the brush spindle 57 and thus the brush rotates with the rollers.

It is found that owing to the slight taper of the cartridges they tend to exert a wedging action and force the rollers apart. This is particularly noticeable when the machine is at rest and is loaded with cartridges. Such displacement of the rollers gives rise to jamming when the machine is started and to overcome this the rollers are supported at one or more intermediate positions by for example, rollers 110 mounted on brackets 111 as indicated in Figures 2 and 4.

What we claim as our invention and desire to secure by Letters Patent is:

1. In apparatus for orienting tapered articles, a pair of rollers having substantially parallel downwardly directed longitudinal axes, the opposed surfaces of said rollers being spaced apart by a distance such that an article can be supported therebetween by engagement of the enlarged portion of the article while a part of the article is directed downwardly between said rollers, means to rotate at least one of said rollers in a direction such that that part of the surface thereof which is opposed to said other roller is moved in an upward direction, and removal means disposed above and adjacent the position at which articles are delivered from said rollers to remove unoriented articles laterally from the vicinity of oriented articles while the latter are supported between said rollers, the opposed surfaces of said rollers being spaced apart further in the region of operation of the removal means than in advance of said region, so as to lower the enlarged ends of oriented articles sufficiently to permit the removal means to engage and sweep off any unoriented articles.

2. In apparatus for orienting tapered articles, a pair of rollers having substantially parallel downwardly directed longitudinal axes, the opposed surfaces of said rollers being spaced apart by a distance such that an article can be supported therebetween by engagement of the enlarged portion of the article while a part of the article is directed downwardly between said rollers, means to rotate at least one of said rollers in a direction such that that part of the surface thereof which is opposed to said other roller is moved in an upward direction, and a rotatable brush disposed above and adjacent the position at which articles are delivered from said rollers to remove unoriented articles from the vicinity of oriented articles while the latter are supported between said rollers, said rollers being of slightly reduced diameter in the region of operation of the rotatable brush, so as to lower the enlarged ends of oriented articles sufficiently to permit the rotatable brush to engage and sweep off any unoriented articles.

3. In apparatus for orienting tapered articles, a pair of rollers having substantially parallel, downwardly directed longitudinal axes, the opposed surfaces of said rollers being spaced apart by a distance such that an article can be supported therebetween by engagement of the enlarged portion of the article while a part of the article is directed downwardly between said rollers, means to rotate the said rollers in opposite directions such that that part of the surface of each roller which is opposed to said other roller is moved in an upward direction, a container for unoriented articles, transfer means operable automatically to transfer intermittently articles from said container to said rollers, a yieldable baffle disposed above said rollers to impede the downward movement of unoriented articles, and removal means disposed above and adjacent the position at which articles are delivered from said rollers to remove unoriented articles from the vicinity of oriented articles while the latter are supported between said rollers, said rollers being of slightly reduced diameter in the region of operation of the removal means so as to lower the enlarged ends of the oriented articles sufficiently to permit the removal means to engage and sweep off any unoriented articles.

4. In apparatus for orienting articles, a pair of rollers having substantially parallel downwardly directed longitudinal axes, the opposed surfaces of said rollers being spaced apart by a distance such that an article can be supported therebetween by engagement of the enlarged portion of the article while a part of the article is directed downwardly between said rollers, means to rotate at least one of said rollers in a direction such that that part of the surface thereof which is opposed to said other roller is moved in an upward direction, and a rotatable brush disposed above and adjacent the position at which articles are delivered from said rollers and with its axis of rotation disposed lengthwise of the rollers to remove unoriented articles laterally from the vicinity of oriented articles while the latter are supported between said rollers, said rollers being of slightly reduced diameter in the region of operation of the rotatable brush, so as to lower the enlarged ends of oriented articles sufficiently to permit the rotatable brush to engage and sweep off any unoriented articles.

5. In apparatus for orienting articles, a pair of rollers having substantially parallel, downwardly directed longitudinal axes, the opposed surfaces of said rollers being spaced apart by a distance such that an article can be supported therebetween by engagement of the enlarged portion of the article while a part of the article is directed downwardly between said rollers, means to rotate the said rollers in opposite directions such that that part of the surface of each roller which is opposed to said other roller is moved in an upward direction, a container for unoriented articles, transfer means operable automatically to transfer intermittently articles from said container to said rollers, a yieldable baffle disposed above said rollers to impede the downward movement of unoriented articles, and removal means disposed above and adjacent the position at which articles are delivered from said rollers to remove unoriented articles laterally from the vicinity of oriented articles while the latter are supported between said rollers, said rollers being of slightly reduced diameter in the region of operation of the removal means so as to lower the enlarged ends of the oriented articles sufficiently to permit the removal means to engage and sweep off any unoriented articles.

RICHARD WILLIAM HARRIS.
GEORGE DEARSLEY.